United States Patent [19]
Murray

[11] Patent Number: 4,765,639
[45] Date of Patent: Aug. 23, 1988

[54] IMPLEMENT SWING HITCH PERMITTING ENDWISE TRANSPORT

[75] Inventor: David L. Murray, Lee's Summit, Mo.

[73] Assignee: Deutz-Allis Corporation, Milwaukee, Wis.

[21] Appl. No.: 39,928

[22] Filed: Apr. 20, 1987

[51] Int. Cl.⁴ .............................................. A01B 73/00
[52] U.S. Cl. .................................. 280/415 R; 56/228; 172/625
[58] Field of Search ........... 280/415 R, 411 R, 411 A, 280/411 C, 472, 474 R; 56/228; 172/248, 311, 625; 292/266

[56] References Cited
U.S. PATENT DOCUMENTS
4,460,193  7/1984  Dietz et al. ..................... 172/248 X
4,682,462  7/1987  Johnson, Sr. ............... 280/415 R X Primary Examiner—David M. Mitchell
Assistant Examiner—Mitchell J. Hill
Attorney, Agent, or Firm—Charles L. Schwab

[57] ABSTRACT

A wide multi-row planter has a tongue which upon being disconnected at one point from the planter frame can be pivoted from its field position to an endwise transport position wherein the tongue and planter frame are within the tread width of the transport wheels. In its transport position, the tongue is secured to the planter frame by a releasable latch.

15 Claims, 3 Drawing Sheets

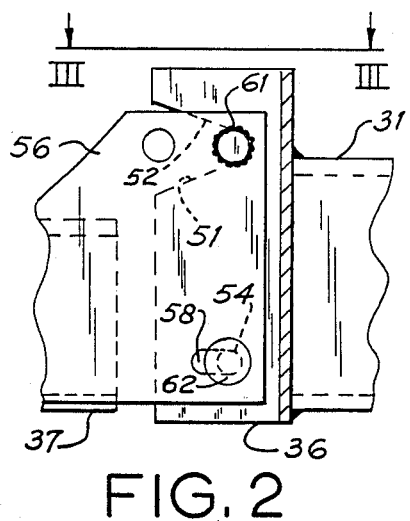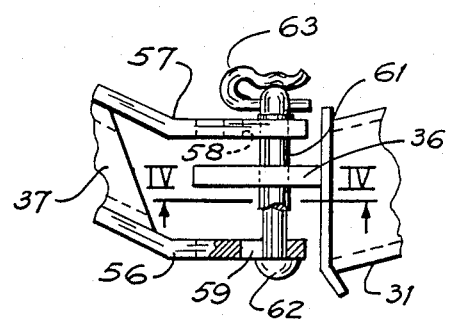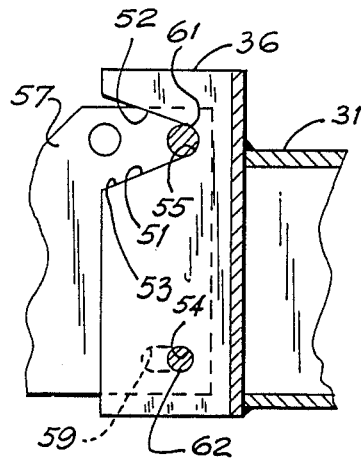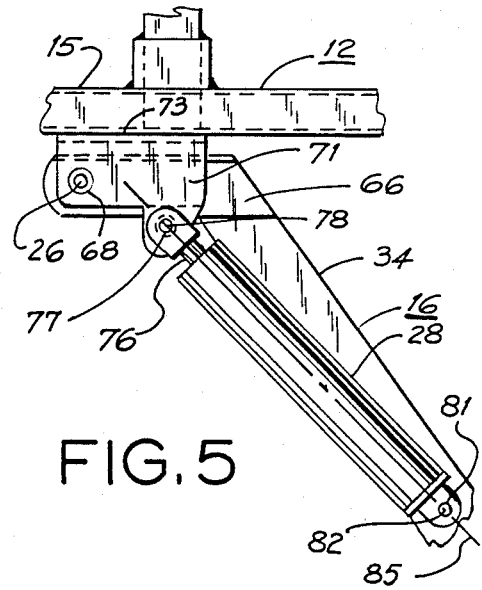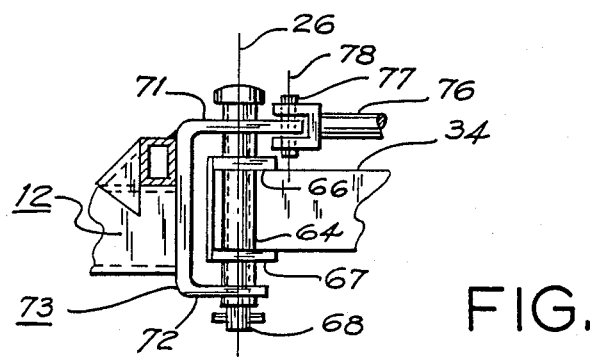

IMPLEMENT SWING HITCH PERMITTING ENDWISE TRANSPORT

TECHNICAL FIELD

This invention relates to draft hitches for agricultural implements and more particularly to a swing hitch permitting endwise transport of the implement.

PRIOR ART STATEMENT

Improvements in agricultural economics have been accompanied by larger size farming operations and larger farm equipment. Today's farmer may be farming three or four farms which may or may not be contiguous. The larger and wider implements must be transported endwise on the roads to and from the various fields, through narrow gates, across narrow culverts and through entrances to fields. U.S. Pat. No. 4,340,239 issued July 20, 1982 to Kenneth E. Shoup for Farm Implement with Two-Way Hitch shows and describes a wide implement with a tongue which, after being disconnected from a stabilizing link, can be swung about a pivot connection with the implement frame from an implement working or field position to an endwise transport position. Upon swinging the tongue to its endwise transport position and upon pivoting the stabilizing link to a position alongside the front of the implement frame, the hitch components are within the tread width of the implement transport wheels provided for endwise transport.

OBJECTS AND SUMMARY OF THE INVENTION

A primary object of this invention is to provide a swing hitch wherein the draft tongue is pivotable about a vertical axis between a field working position and an endwise transport position after disconnecting the tongue from a stationary bracket rigidly mounted on the implement frame.

It is a further object of this invention to provide a swing hitch as stated in the previous object wherein the tongue and stationary bracket are within the tread width of the transport wheels when the tongue is in its endwise transport position.

This invention is especially useful in wide frame agricultural implements which must be transported endwise to and from farm fields. An elongated tongue includes a draft portion having a pivot part at its front end adapted for connection to a tractor hitch and a connecting section rigidly secured to the draft portion and extending at an obtuse angle thereto to a pivot part pivotally connected to the implement frame on a vertical axis spaced laterally from the longitudinally central plane of the frame of the implement. The pivot part on the front of the tongue lies approximately in the longitudinal central plane in the working position of the tongue. An intermediate part of the tongue is releasably secured to a bracket immovably fixed to the implement frame. The construction of the tongue and bracket is such that in the endwise transport position of the tongue, these components are within the tread width of the transport wheels.

BRIEF DESCRIPTION OF THE DRAWINGS

One embodiment of the invention is illustrated in the drawings, in which:

FIG. 2 is a view taken along the line II—II in FIG. 1;

FIG. 3 is a view taken along the line III—III in FIG. 2;

FIG. 4 is a view taken along the line IV—IV in FIG. 3;

FIG. 5 is an enlarged partial top view of the pivot connection between the tongue and the planter frame;

FIG. 6 is a view taken along the line VI—VI in FIG. 1;

DETAILED DSCRIPTION OF THE DRAWINGS

Figure 1:
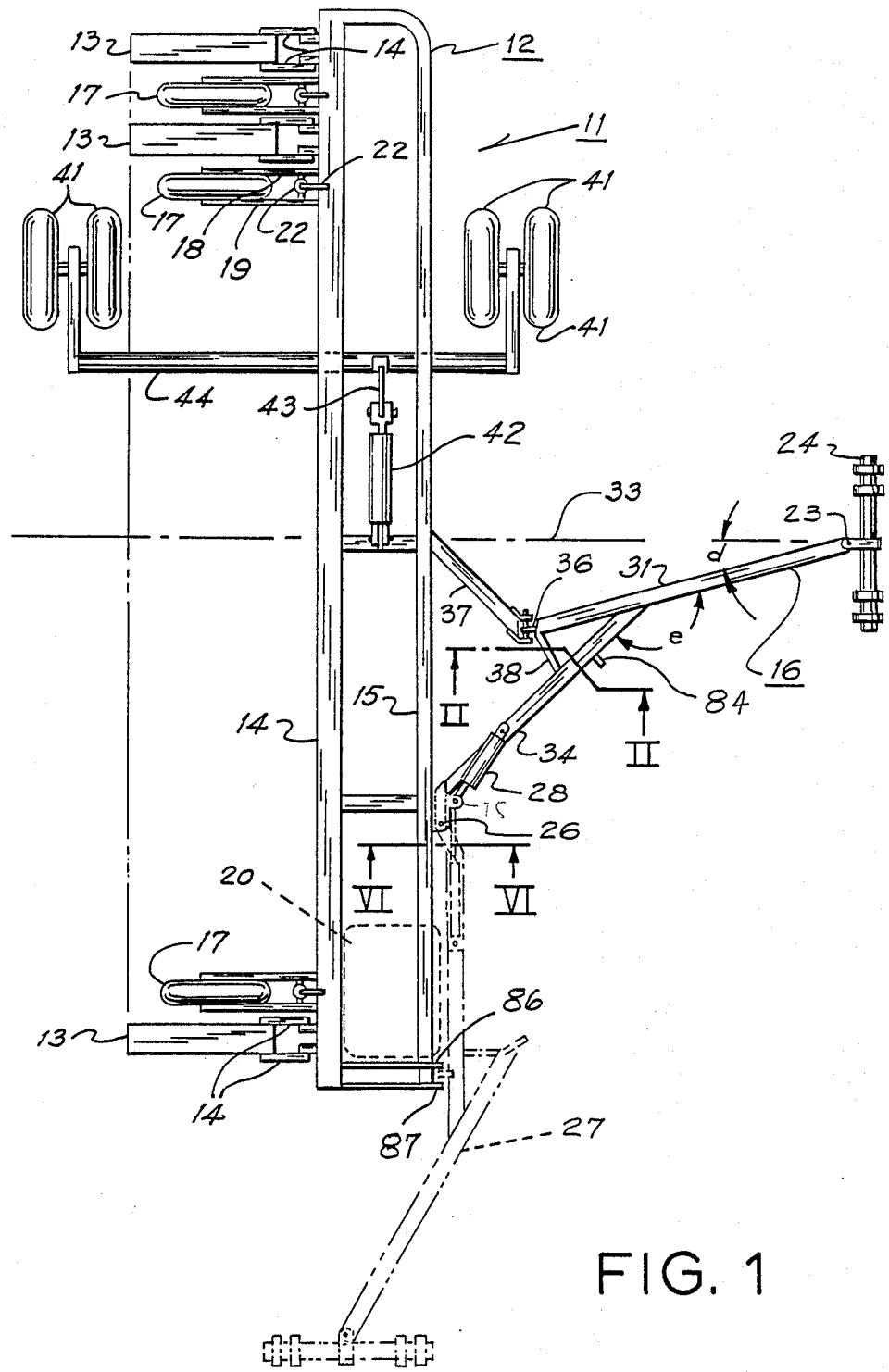
FIG. 1 is a top view of an agricultural row crop planter.

Referring to FIG. 1, an agricultural planter 11 includes an elongated frame 12 to which a dozen trailing planting units 13, only three of which are shown, are each connected by four bar parallel linkages 14. The frame 12 includes a pair of front and rear transverse hollow beams 14, 15 rigidly interconnected by fore and aft braces welded thereto. A plurality of liquid fertilizer tanks, such as tank 20, may be mounted on the frame 12. The frame 12 is connected in towed relation to the three-point hitch of a tractor, not shown, by a tongue 16. The raising and lowering of the frame 12 of the planter during a planting operation is controlled by hydraulically operated support wheels 17, each rotatably supported on a pair of support arms 18, 19 pivotally connected to the frame 12. A vertically disposed hydraulic jack 21 is interposed between a bracket 22 on the frame 12 and a cross member between the support arms 18, 19. The front end of the tongue 16 includes a pivot part which is pivotally connected by a vertical pivot pin 23 to a transverse bar 24 which is adapted for connection to draft elements of a three-point hitch on a towing tractor. The rear end of the tongue 16 is pivotally connected to the planter frame 12 on a vertical pivot axis 26 about which the tongue 16 may be pivoted, between its field or working position shown in full lines and its endwise transport position shown in broken lines 27, by extension of double acting hydraulic jack 28.

The tongue 16 includes a draft portion 31 extending forwardly to meet the central longitudinal vertical plane 33 of the planter at an angle "d" of 15 degrees. The tongue 16 also includes a connecting portion 34 which is welded at its front end to an intermediate part of the draft portion 31 and extends rearwardly at an obtuse angle "e" of 150 degrees terminating in an end part pivotally connected to the planter frame 12 on the vertical axis 26. The draft portion 31 of the tongue 16 extends rearwardly beyond its rigid connection with the connecting portion 34 terminating at its rear end in a vertical and rearwardly extending connector plate 36 releasably connected to a bracket 37 which is rigidly secured to the frame 12. A cross brace 38 rigidly interconnects the rear end of the draft portion 31 and an intermediate part of the connecting portion 34. When the planter is transported endwise, the transport wheels 41 on arms of a rock shaft 44 are lowered relative to the frame 12 by extension of a double acting hydraulic jack 42 disposed between the frame 12 and a lever arm 43 on the rock shaft 44. The rock shaft 44 is pivotally supported on a horizontal axis by pivot bearing brackets, not shown, secured to the underside of the frame 12.

Referring to FIGS. 2-4, the vertical connector component or plate 36 on the rear end of the draft portion 31 of the tongue 16 includes a V-shaped indexing notch 51 formed by upper and lower camming surfaces 52, 53 which converge in a forward direction terminating in a curved indexing seat or crotch 55. A transverse horizontal bore 54 is formed in the lower part of the plate 36 in vertically spaced relation to the notch 51. The bracket 37, rigidly secured to the frame 12, includes a pair of laterally spaced vertical connector components in the form of plates 56, 57 which have transversely aligned openings through which an alignment member in the form of a pin 61 extends. The pin 61 is welded to the plates 56, 57. The lower parts of the plates 56, 57 include transversely aligned openings 58, 59 which are horizontally elongated in a fore and aft direction. When the alignment pin 61 fits in the crotch 55 of the indexing notch 51 as shown in FIGS. 2-4, the elongated openings 58, 59 will be in alignment with the bore 54 and a removable connector pin 62 can be inserted and locked in place by a bent wire retainer 63, thus releasably securing the tongue 16 to the frame at a point intermediate the longitudinal plane 33 and the pivot axis 26. Upon removal of the pin 62, the tongue 16 is disconnected from the bracket 37 and may be swung from its field position to its transport position by extending the jack 28.

Referring to FIGS. 5 and 6, a vertical bushing 64 extends through vertically aligned openings in and is welded to the vertically spaced horizontal plates 66, 67 of the rear end of the tongue 16 so as to present a vertical cylindrical opening for receiving a vertical pivot pin 68 which extends through aligned bushings welded to upper and lower horizontal flanges 71, 72 of a U-shaped bracket 73 welded to the frame 12. The extensible piston rod 76 of the hydraulic jack 28 is pivotally connected to the upper flange 71 by a vertical pin 77 having a vertical axis 78. The cylinder 79 of the jack 28 is pivotally connected to the connecting portion 31 of the tongue 16 by a vertical pivot pin 81 having a vertical axis 82. As can be seen in FIG. 5, when the tongue is in its field position, a plane 85 through the axes 78, 82 passes on that lateral side of the axis 26 of pivot pin 68 which is nearest the central plane 33 of the planter. The axis of the jack 28, which lies in the plane 85, passes on the inboard side of the vertical pivot pin axis 26. This ensures that when the jack 28 is contracted, the connector plate 36 on the intermediate part of the tongue 16 will be positioned for connection to the bracket 37 by the pin 62.

Figure 7:
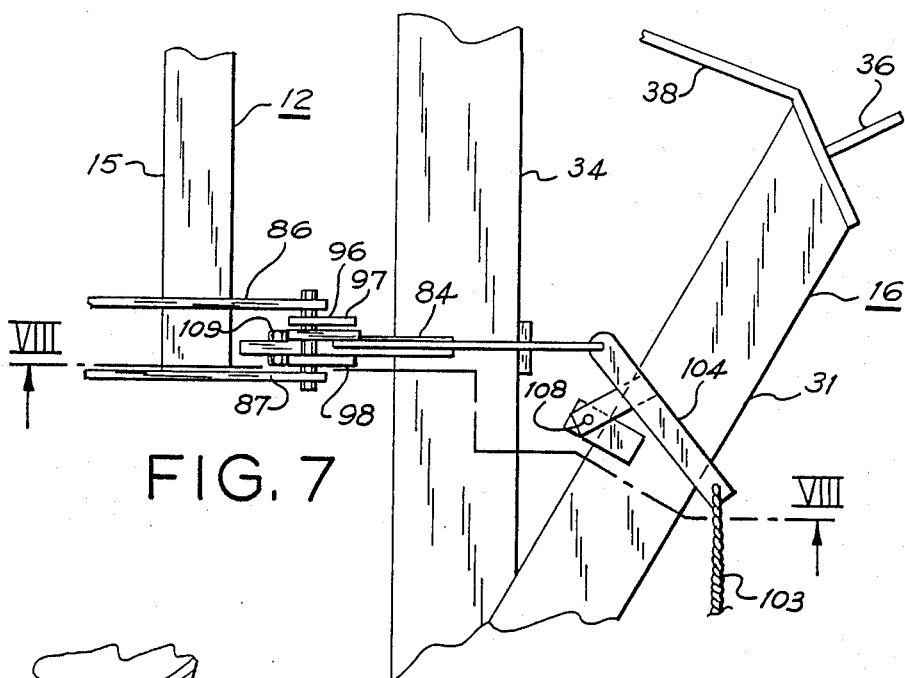
FIG. 7 is an enlarged partial top view of a portion of the tongue and planter frame in the endwise transport position of the latter.
Figure 8:
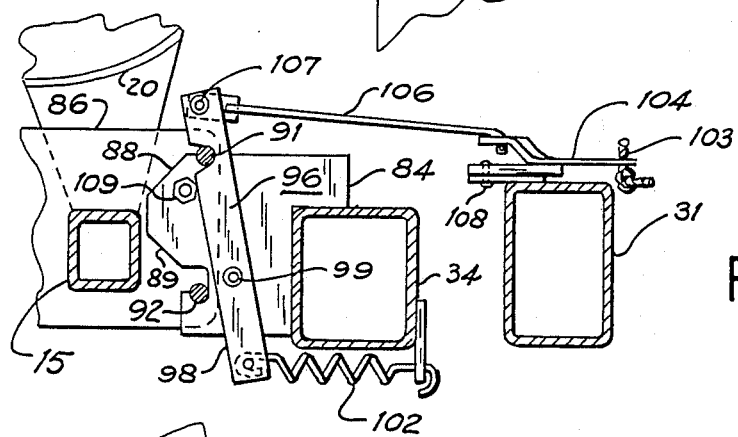
FIG. 8 is a view taken along the line VIII—VIII in FIG. 7.
Figure 9:
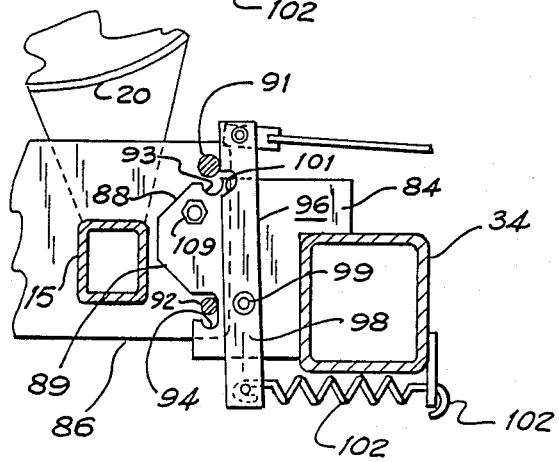
FIG. 9 is a view similar to FIG. 8 but showing the components prior to latching the tongue to the frame in the transport position of the tongue.

Referring to FIGS. 7-9, the tongue 16 has been pivoted about the axis 26 of the pivot pin 68 from its field position, shown in solid lines in FIG. 1, to its transport position in which the connecting portion 34 of the tongue is disposed generally parallel to and alongside the front side of the transversely extending planter frame 12 and the front end of the tongue 16 is disposed near a transverse vertical central plane parallel to the frame member 14. In this position, a vertical connector plate 84 welded to the connecting portion 34 is disposed between two parallel vertical plates 86, 87 extending fowardly from the frame 12. The fee end of the plate 84 includes tapered surfaces 88, 89 defining a camming or guide nose for camming between upper and lower parallel connectors in the form of transverse pins 91, 92 secured to the plates 86, 87. After swinging the tongue 16 to the position shown in FIG. 9, in which the pins 91, 92 are disposed above and in vertical alignment with a pair of vertically spaced upwardly open notches or recesses defined by surfaces 93, 94 in the plate 84, the tongue 16 is next raised and as the load is taken up by the tongue from the support wheels 17 nearest the towing tractor, the deflection of the tongue 16 in supporting part of the planter weight will bring the notches 93, 94 into supporting engagement with the horizontal pins 91, 92 as shown in FIG. 8. When the pins 91, 92 are thus seated in the notches 93, 94, a latch element in the form of a lever 96 locks the tongue 16 to the frame 12. The latch lever 96 includes a pair of upright parallel arms 97, 98 pivotally connected intermediate their opposite ends to the plate 84 by a horizontal pivot pin 99 disposed transverse to the plate 84. Aligned notches 101 are formed in the upper parts of the arms 97, 98 to provide an abutment portion for locking engagement with the upper pin 91 when the latch lever 96 is in its locking position shown in FIG. 8. The latch lever 96 is resiliently biased to its locking position by a tension spring 102 interconnected between the lower end of the latch lever 96 and the connecting portion 34 of the tongue 16. The latch lever 96 can be pivoted by the operator on the tractor, not shown, by pulling on a flexible tension member in the form of a rope 103, one end of which is connected to a free end of a latch operating lever 104. One end of a rigid link 106 is pivotally connected to the upper end of the latch lever 96 by a horizontal pin 107 and the other end of the link 106 is pivotally connected to the end of the operating lever 104 opposite the end that is connected to the rope 103. The lever 104 pivots about a vertical pivot pin 108 on the draft portion 31 of the tongue 16 when the rope 103 is pulled thereby moving the latch element or lever 96 from its latching or locking position shown in FIG. 8 to at least the position shown in FIG. 9 thus permitting the plate 84 of the tongue 16 to be disconnected from the planter frame 12 upon lowering the tongue 16. Referring to FIG. 9, when the tongue 16 is swung away from its endwise transport position shown in FIGS. 7-9, the spring 102 will cause the latch lever 96 to pivot toward its locking position, in which event it will abut a stop bolt 109 secured to the plate 84.

OPERATION

In order to swing the tongue 16 from the field position shown in solid lines in FIG. 1 to the transport position shown in broken lines 27 in FIG. 1, the operator lowers the transport wheels 41 to take downward load off the tongue 16 so that the pin 62 can be easily removed. The hydraulic jack 28 is extended causing the left end of the planter frame to swing rearwardly on the transport wheels as the right end of the planter frame rolls toward the rear of the tractor. The left end of the planter is at the top of FIG. 1 and the right end is at the bottom of FIG. 1. After some initial swing movement of the planter frame, the tractor may be driven in a forward direction as the jack is further extended to bring the hitch 16 to its transport position which places the front end of the hitch at the right-hand side of the planter. The transport wheels 41 are raised slightly to lower the trailing end of the frame 12 and, if necessary, the three-point hitch of the tractor is lowered so as to permit the nose of the plate 84 to enter between the pins 91, 92 and place the latter in vertical registration with the recesses 93, 94. The three-point hitch of the tractor is then raised causing the tongue 16 to deflect as it takes up the load of the planter thereby bringing the recesses 93, 94 into vertical load transmitting engagement with the pins 91, 92.

The tension spring 102 will automatically cause the latch element 96 to lock the pins in their recess engaging positions shown in FIG. 8. It will be noted that during the swing of the tongue from its field position to its transport position, the axis 26 is not aligned with the axis of the linear actuator in the form of the hydraulic jack 28. It will also be noted that upon disconnecting the releasable connection between the intermediate part of the tongue 16 and the frame, that is, withdrawal of the pin 62 connecting the connectable components in the form of the vertical connector plate 36 and the vertical plates 56, 57, the tongue may be swung 135 degrees in a horizontal plane about the vertical pivot axis 26 from its field position to its transport position. In the endwise transport position, the components 36, 56, 57, and all other components of the planter, are within the tread width of the transport wheels 41. In the transport position, the planter hitch 16 lies within the tread width of the wheels 41, and that width is sufficiently narrow to permit endwise transport on rural roads and through normal width farm gates and across most existing culverts at field entrances along rural roads. Thus, this hitch provides a simple inexpensive means for endwise transport of a very wide field implement. Since the tongue 16 is releasably connected by the pin 62 with a rigid part of the frame 12 which does not extend beyond the tread width of the transport wheels 41, use of a separate pivotable interconnecting link is avoided.

The embodiments of the inventions in which an exclusive property or privilege is claimed are defined as follows:

1. In a row crop planter having a transversely extending main frame to which a plurality of planter units are mounted at transversely spaced intervals in trailing relation to the rear of the frame, a plurality of ground engaging wheels supporting the frame during a planting operation and transport wheels supported on the frame for movement between a raised position out of ground contact and a lowered transport position in which they engage the ground and support the planter for endwise transport in a direction transverse to the central longitudinal plane of the planter, a swing hitch structure including a tongue having
a draft portion with a front end adapted for towed connection to a tractor and
a connecting portion rigidly secured to the draft portion and extending at an obtuse angle to a front part of the frame intermediate one of its transverse ends and said central longitudinal plane of the planter,
a pivot connection between said front part of said frame and the rear end of said connecting portion of said tongue permitting the latter to swing about a vertical pivot axis from a field position in which said front end of said draft portion is approximately at said longitudinal plane to an endwise transport position in which said connecting portion is alongside the front of said frame and said front end is spaced outwardly from said one transverse end of said frame,
a releasable connection between an intermediate part of said tongue and said frame securing said intermediate part to said frame when said tongue is in said field position, said releasable connection including a first component rigidly secured to said frame, a second component rigidly secured to said tongue and pin means releasably securing said components to one another, said releasable connection being spaced from said vertical pivot axis in a transverse direction toward the opposite end of said frame from said one end thereof, said components lying within the tread width of said transport wheels when said tongue is in its endwise transport position and
latch means releasably connecting said tongue to said frame in the endwise transport position of said tongue.

2. The combination of claim 1 and further comprising an extensible and contractable linear actuator operatively interposed on a horizontal axis between said tongue and said frame and operable to move said tongue between said field and transport positions.

3. The combination of claim 2 wherein said actuator is a double acting hydraulic jack having coaxial cylinder and piston rod elements pivotally connected to said tongue and frame, respectively.

4. The combination of claim 3 wherein said vertical pivot axis is spaced horizontally from the axis of said jack in all positions of said tongue.

5. The combination of claim 4 wherein the axis of said jack is disposed in the horizontal space between said vertical pivot axis and said longitudinal plane when said tongue is in said field position.

6. The combination of claim 1 wherein said releasable connection includes longitudinally converging camming surfaces forming an indexing notch in at least one of said components, said notch being open in one longitudinal direction, and a transverse and horizontally extending alignment member secured to other of said components which cooperatively engages said indexing notch in said field position of said tongue, said releasable connection further including horizontally alignable openings in said components and a releasable pin insertable in said openings when said tongue is in its field position, said pin being operable to interconnect said components thereby securing said intermediate part of said tongue to said frame.

7. The combination of claim 1 wherein said releasable connection components are spaced from said longitudinal plane and are disposed between said pivot axis and said longitudinal plane when said tongue is in said field position.

8. The combination of claim 1 wherein said tongue pivots approximately 135 degrees in moving from its field position to its transport position.

9. The combination of claim 1 and further comprising a cross brace rigidly interconnecting the rear end of said draft portion and an intermediate part of said connecting portion of said tongue.

10. In combination with a wide implement having a frame elongated in a horizontal direction transverse to the longitudinal direction of operation of the implement during a field working operation, a plurality of transversely spaced support wheels mounted on said frame for vertical adjustment to support said frame during its movement in said longitudinal direction and a plurality of longitudinally spaced transport wheels mounted on said frame for vertical adjustment to support said frame during endwise transport thereof in said transverse direction, a swing hitch structure comprising:

a tongue having a rear end pivotally connected to said frame on a vertical pivot axis for swinging movement between a field position in which the front end of the tongue lies approximately in the central longitudinal vertical plane of the implement and a transport position in which the front end of the tongue is disposed laterally outward from one transverse end of said frame, said pivot axis being intermediate said one transverse end of said frame and said longitudinal plane, and a first connector component rigidly secured to said frame, a second connector component rigidly secured to said tongue, said components having openings aligned on a transverse axis when said tongue is in said field position, and a transverse pin extending through said aligned openings in said components thereby forming a releasable connection between said tongue and said frame, said components in said field position of said tongue being disposed horizontally intermediate said pivot axis and said longitudinal plane, said components in said transport position of said tongue being disposed within the tread width of said transport wheels.

11. The combination of claim 10 and further comprising a releasable latch means operable to connect said tongue to said frame in said transport position.

12. In a row crop planter having a transversely extending main frame to which a plurality of planter units are mounted at transversely spaced intervals in trailing relation to the rear of the frame, a plurality of ground engaging wheels supporting the frame during a planting operation and transport wheels supported on the frame for movement between a raised position out of ground contact and a lowered transport position in which they engage the ground and support the planter for endwise transport, a swing hitch structure including a tongue having
a draft portion with a front end adapted for towed connection to a tractor and
a connecting portion rigidly secured to the draft portion and extending at an obtuse angle to a front part of the frame intermediate one of its transverse ends and a central longitudinal plane of the planter, a pivot connection between said front part of said frame and the rear end of said connecting portion of said tongue permitting the latter to swing about a vertical pivot axis from a field position in which said front end of said draft portion is approximately at said longitudinal plane to an endwise transport position in which said connecting portion is alongside the front of said frame and said front end is spaced outwardly from said one transverse end of said frame, a connection between an intermediate part of said tongue and said frame releasably securing said intermediate part to said frame when said tongue is in said field position, said connection including components on said frame and tongue spaced from said vertical pivot axis in a transverse direction toward the opposite end of said frame from said one end thereof, said components lying within the tread width of said transport wheels when said tongue is in its endwise transport position and latch means releasable connecting said tongue to said frame in the endwise transport position of the latter including a latch member on said tongue with surfaces defining a pair of vertical spaced and upwardly open recesses, a pair of vertically spaced connectors on said frame seated in said recesses, respectively, when said tongue is in said transport position and a latch element mounted on said tongue for shifting movement between latched and unlatched positions having an abutment portion lockingly engaging at least one of said connectors when the latter is seated in one of said recesses and said latch element is in its latching position.

13. The combination of claim 12 wherein said latch member has a guide nose with tapered surfaces for cammingly engaging said connectors during swinging movement of said tongue to its transport position.

14. In a row crop planter having a transversely extending main frame to which a plurality of planter units are mounted at transversely spaced intervals in trailing relation to the rear of the frame, a plurality of ground engaging wheels supporting the frame during a planting operation in which the planter is moved in the direction of its longitudinal central plane and transport wheels supported on the frame for movement between a raised position out of ground contact and a lowered transport position in which they engage the ground and support the planter for endwise transport, a swing hitch structure including a tongue having
a draft portion with a front end adapted for towed connection to a tractor, said draft portion extending rearwardly and laterally from said longitudinal central plane at an acute angle of less than 20 degrees and more than 10 degrees and
a connecting portion rigidly secured to said draft portion and extending at an obtuse angle to a front part of said frame intermediate one of its transverse ends and said central longitudinal plane of said planter, a pivot connection between said front part of said frame and the rear end of said connecting portion of said tongue permitting the latter to swing about a vertical pivot axis from a field position in which said front end of said draft portion is approximately at said longitudinal central plane to an endwise transport position in which said connecting portion is alongside the front of said frame and said front end is spaced outwardly from said one transverse end of said frame, a connection between an intermediate part of said tongue and said frame releasably securing said intermediate part to said frame when said tongue is in said field position, said connection including components on said frame and tongue spaced from said vertical pivot axis in a transverse direction toward the opposite end of said frame from said one end thereof, said components lying within the tread width of said transport wheels when said tongue is in its endwise transport position and latch means releasably connecting said tongue to said frame in the endwise transport position of the latter.

15. The combination of claim 14 wherein said connecting portion extends rearwardly and laterally from said draft portion at an angle of more than 135 degrees and less than 165 degrees.

* * * * *